Oct. 9, 1923.
J. A. FLECKENSTEIN
1,469,922
DOOR AND WALL PANEL FOR VEHICLES
Filed Feb. 2. 1922   3 Sheets-Sheet 2
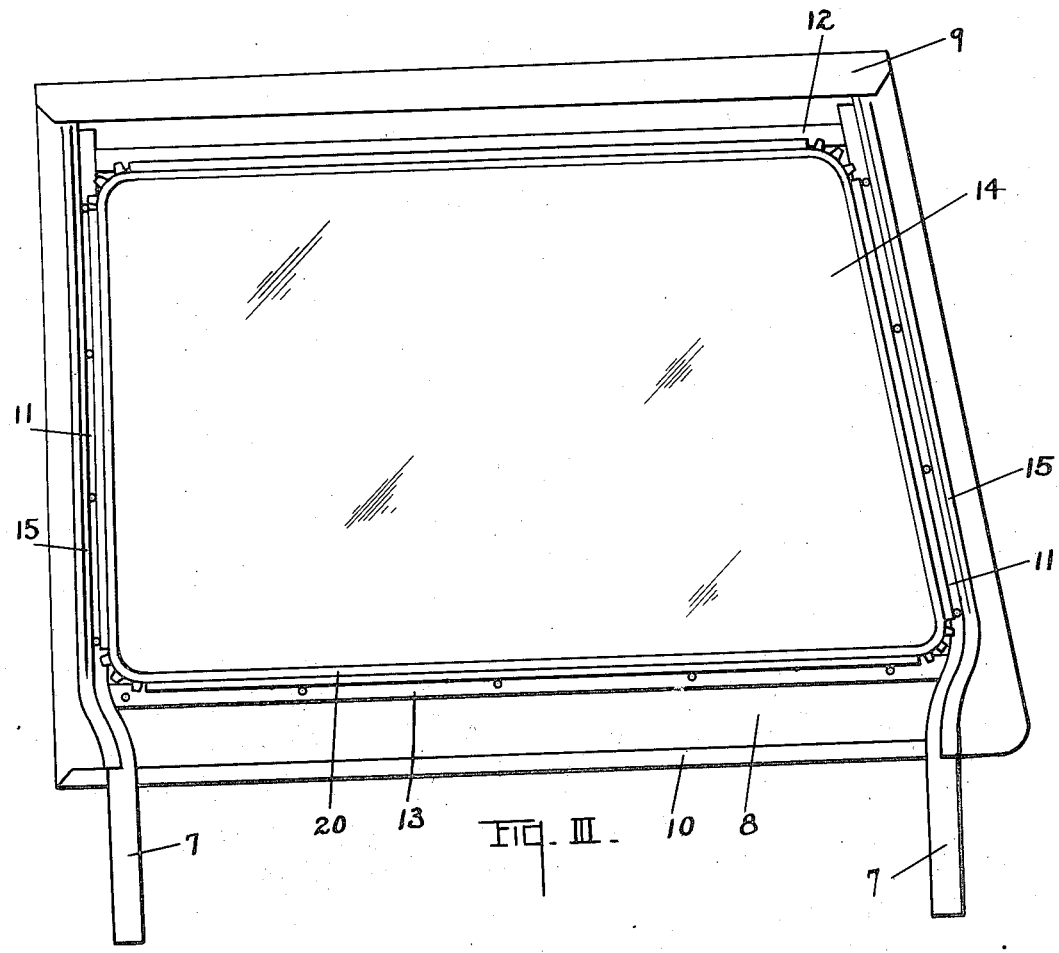
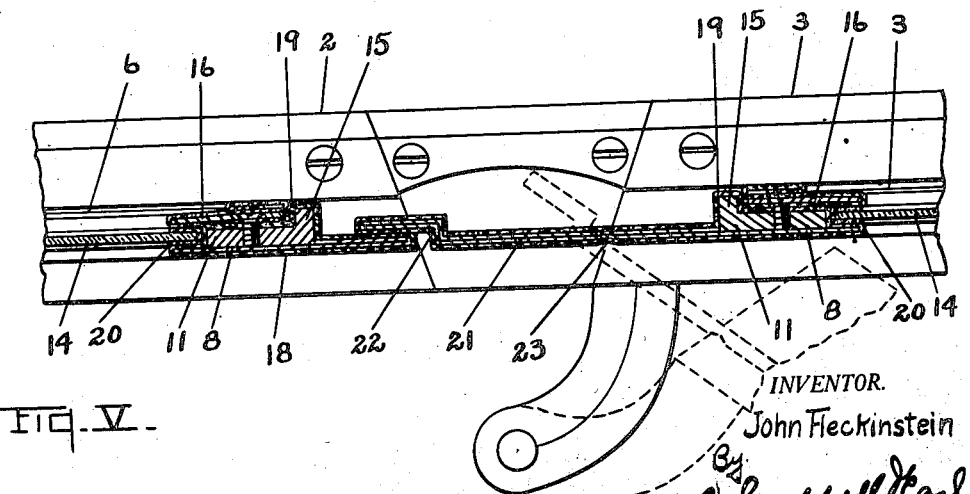
INVENTOR.
John Fleckinstein
By
ATTORNEYS

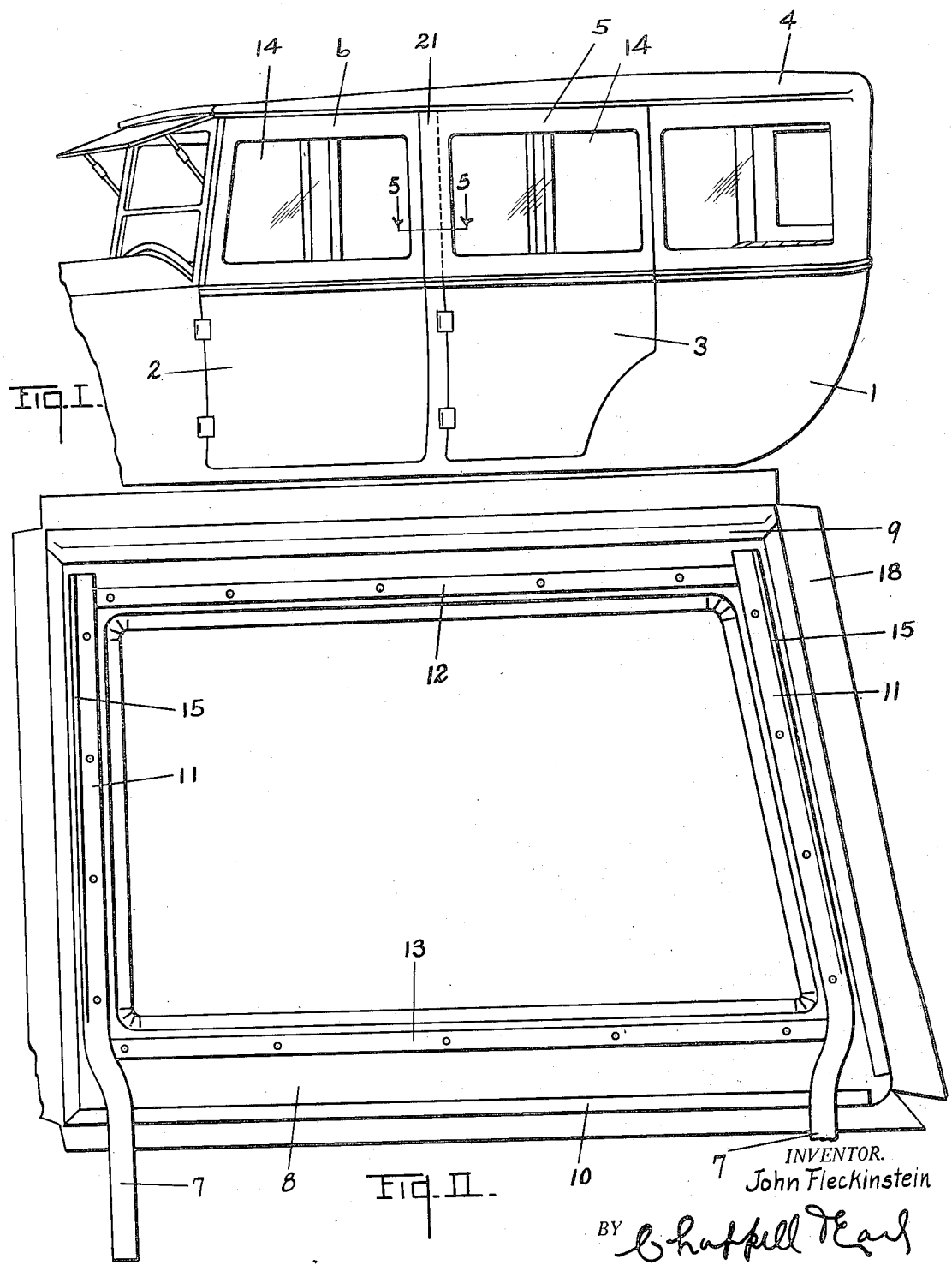

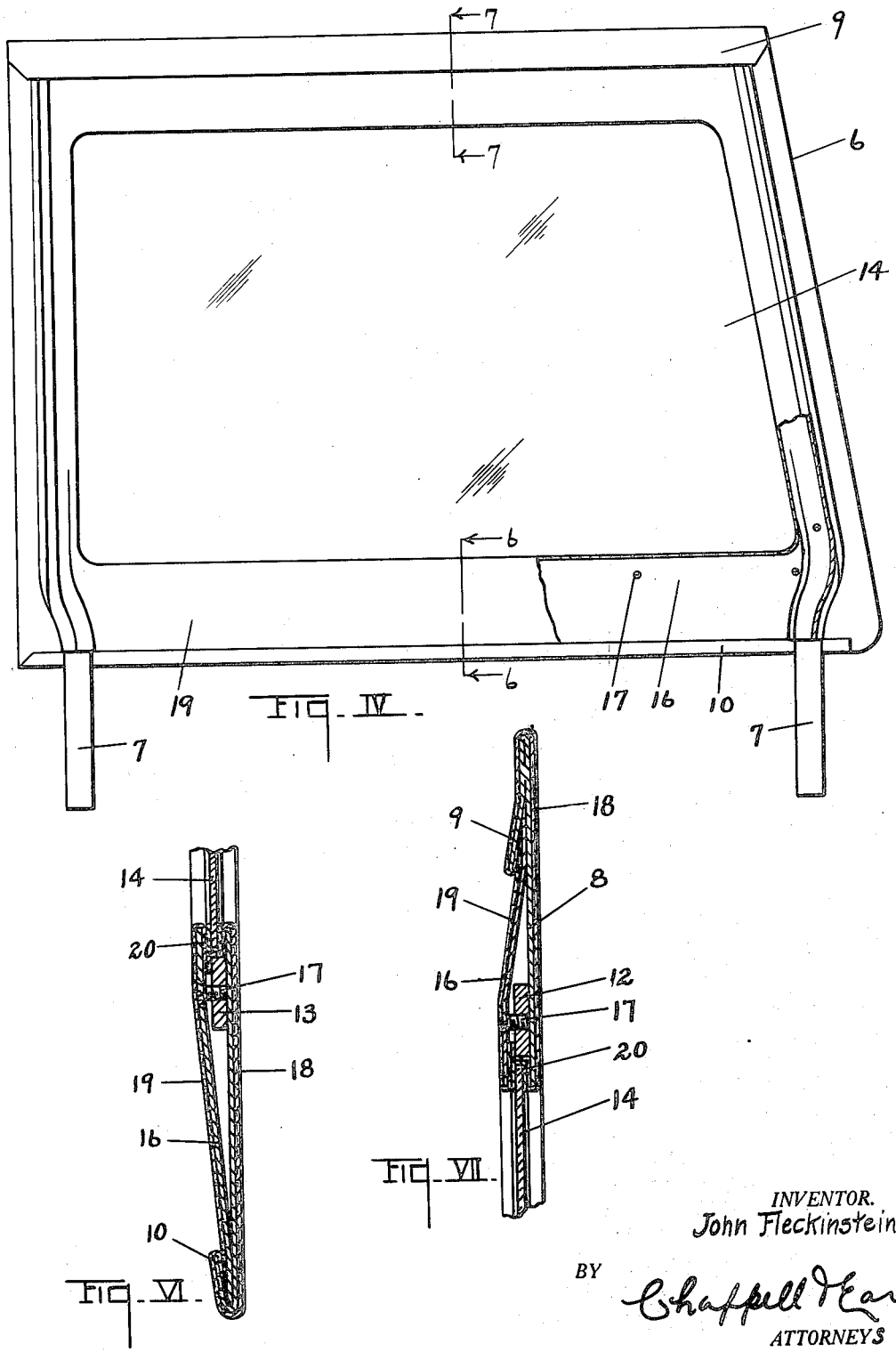

Patented Oct. 9, 1923.

1,469,922

UNITED STATES PATENT OFFICE.

JOHN A. FLECKENSTEIN, OF KALAMAZOO, MICHIGAN, ASSIGNOR TO LIMOUSINE BODY COMPANY, OF KALAMAZOO, MICHIGAN.

DOOR AND WALL PANEL FOR VEHICLES.

Application filed February 2, 1922. Serial No. 533,566.

*To all whom it may concern:*

Be it known that I, JOHN A. FLECKENSTEIN, a citizen of the United States, residing at the city and county of Kalamazoo, State of Michigan, have invented certain new and useful Improvements in Door and Wall Panels for Vehicles, of which the following is a specification.

This invention relates to improvements in door and wall panels for vehicles.

The main objects of the invention are:

First, to provide an improved glazed panel for doors and walls of vehicles in which the pane of glass is effectively supported so that it is not subjected to racking strains of the vehicle and is not likely to become loose.

Second, to provide an improved panel for vehicles which is very strong and rigid and at the same time is comparatively light in weight.

Third, to provide an improved panel which has an attractive and finished appearance.

Fourth, to provide an improved panel having these advantages which is simple and economical in its parts, is very easily assembled and may be disassembled and reassembled should occasion require to renew the pane of glass.

Further objects, and objects relating to structural details, will definitely appear from the detailed description to follow.

I accomplish the objects of the invention by the devices and means described in the following specification. The invention is clearly defined and pointed out in the claims.

A structure which is a preferred embodiment of my invention is clearly illustrated in the accompanying drawing, forming a part of this application, in which:

Fig. I is a perspective view of a convertible vehicle body embodying the features of my invention, the body being shown mainly in conventional form and partially broken away.

Fig. II is an inside view of the outer panel member laid upon its covering, illustrating the manner of assembly, certain parts being broken away for convenience in illustration.

Fig. III is an inside view of the outer panel member with the edges of its covering folded thereon.

Fig. IV is an inside view of the completed panel with parts broken away to show structural details.

Fig. V is an enlarged detail horizontal section on a line corresponding to line 5—5 of Fig. I.

Fig. VI is a detail vertical section on a line corresponding to line 6—6 of Fig. IV.

Fig. VII is a detail vertical section on a line corresponding to line 7—7 of Fig. IV.

In the drawing similar reference characters refer to similar parts throughout the several views, and the sectional views are taken looking in the direction of the little arrows at the ends of the section lines.

Referring to the drawing, the body is designated generally by the numeral 1 and is provided with front door 2 and rear door 3. These parts are shown conventionally as the body and doors may be modified as may be desired.

The top 4 is a fixed top, that is, in the structure illustrated it is built in as a part of the body. The structure illustrated has removable door panels 5 and 6, the same being detachably mounted upon the doors by means of the dowel-like arms 7 projecting below the lower edges of the panels. As the details of the socket and clamping means form no part of this invention they are not illustrated herein.

I have illustrated in detail the front door panel 6 as the rear door panel is a duplicate so far as structure is concerned, there being slight additions to close the space between the door panels, as will be later pointed out. The panels comprise the outer panel member 8 of sheet metal having a window opening therein of suitable size, its upper edge being folded rearwardly upon itself to provide an inwardly facing V-shaped channel 9,—see Fig. VII, and its lower edge being folded inwardly upon itself to provide an inwardly facing V-shaped channel 10.

On the outer side of this outer panel member I secure, preferably by spot welding, the upright or side bars 11, top bar 12 and bottom bar 13. These bars form reinforcing means for the outer sheet metal panel and also supports for positioning the window pane 14, which lies with its edges within these bars. In the structure illustrated they are shown as separate pieces but, if desired, they might be united to add further rigidity. The bars 11 have ribs or flanges 15 at their outer edges and are extended at their lower edges to provide the supporting arms or dowels 7.

The inner panel member 16 is also formed of sheet metal and has a window opening corresponding in dimensions to that of the outer panel member. This inner panel member is disposed with its top and bottom edges within the channels 9 and 10 and is secured detachably by the screws 17. The side edges of the inner panel are arranged to lie within the flanges 15.

The panels are provided with suitable finishing coverings of leather or cloth as may be desired, 18 representing the covering for the outer panel member and 19 that of the inner panel member, the inner edges of the outer panel member being folded over the inner edge of the window opening and preferably lapped over the inner edges of the bars 11, 12 and 13, as shown in Fig. VI. The inner edges of the inner covering member are lapped over the inner edges of the inner panel member and these edges are clamped together with the edges of the pane serving as packing members and gaskets therefor as well as providing a finish around the pane.

Packing strips of U cross section 20 are preferably arranged over the edges of the pane, these strips being preferably of water-proof material. The top and bottom edges of the outer covering are folded over and turned into the channels 9 and 10, being wedged and retained therein by the inner panel member. The top and bottom edges of the covering for the inner panel member are tucked into these channels, the glue being preferably applied before the edges are tucked into place, so that they are retained therein. The side edges of the inner covering are folded under and clamped by the panel members. This provides a secure attaching means for the covering and one which is not likely to loosen up in use and also one which effectively prevents the entrance of water under ordinary conditions.

In the embodiment of my improvements illustrated the panel 5 for the rear door is provided with an extension 21 on its forward edge which bridges the space between the doors when closed, the extension having an offset 22 therein into which the front door closes, as shown in Fig. V. When the rear door is opened this extension swings inwardly as is indicated by dotted lines in Fig. V. A groove 23 is formed in this extension aligned with the rear edge of the rear door as a matter of appearance.

I have illustrated and described my improvements in an embodiment which I have found very satisfactory. I have not attempted to illustrate or describe certain modifications and adaptations which might be desirable for bodies of other types than that illustrated as I believe the disclosure made will enable those skilled in the art to which my invention relates to embody or adapt the same as may be desired.

Having thus described my invention, what I claim as new and desire to secure by Letters Patent, is:

1. The combination of an outer panel member having a window opening therein, the top and bottom edges of said panel member being folded inwardly providing inwardly facing channels, side, top and bottom bars secured on the inner side of said outer panel member in a spaced relation to the edges of its window opening and to its outer edges, the side bars having flanges at their outer edges, the lower ends being extended to provide supporting members, a window pane arranged with its edges within said bars, an inner panel member having a window opening therein secured to said bars with its inner edges overlapping the pane, its side outer edges lying within the flanges of said side bars and its top and bottom edges within said channels, and coverings for said panel members, the inner edges of the coverings being folded into the window openings of the panel members and clamped with the edges of the pane with the edges of the outer covering overlapping the inner edges of said bars, the outer edges of the outer panel member covering being folded upon the inside of the outer panel member with their top and bottom edges folded into the said channels and their side edges overlying the ribs of the side bars, the side edges of the inner panel member covering being folded under the edges thereof and the top and bottom edges being tucked into said channels.

2. The combination of an outer panel member having a window opening therein, the top and bottom edges of said panel member being folded inwardly providing inwardly facing channels, side, top and bottom bars secured on the inner side of said outer panel member in a spaced relation to the edges of its window opening and to its outer edges, a window pane arranged with its edges within said bars, an inner panel member having a window opening therein secured to said bars with its inner edges overlapping the pane and its top and bottom edges within said channels, and coverings for said panel members, the inner edges of the coverings being folded into the window openings of the panel members and clamped with the edges of the pane, the outer edges of the outer panel member covering being folded upon the inside of the outer panel member with their top and bottom edges folded into the said channels and their side edges clamped by the inner panel member.

3. The combination of an outer panel member having a window opening therein, the top and bottom edges of said panel member being folded inwardly providing inwardly facing channels, side, top and bottom bars secured on the inner side of said outer panel member in a spaced relation to the edges of its window opening and to its outer edges, the side bars having flanges at their outer edges, the lower ends being extended to provide supporting members, a window pane arranged with its edges within said bars, and an inner panel member having a window opening therein secured to said bars with its inner edges overlapping the pane, its side outer edges lying within the flanges of said side bars and its top and bottom edges within said channels.

4. The combination of an outer panel member having a window opening therein, the top and bottom edges of said panel member being folded inwardly providing inwardly facing channels, side, top and bottom bars secured on the inner side of said outer panel member in a spaced relation to the edges of its window opening and to its outer edges, a window pane arranged with its edges within said bars, and an inner panel member having a window opening therein secured to said bars with its inner edges overlapping the panel and its top and bottom edges within said channels.

5. The combination of an outer panel member having a window opening therein, the top and bottom edges of said panel member having inwardly facing channels, pane supporting members on the inner side of said outer panel member disposed in spaced relation to the edges of the window opening, a window pane arranged with its edges within said members, an inner panel member having a window opening therein arranged with its inner edges overlapping the pane and its top and bottom edges within said channels, and coverings for said panel member, the inner edges of the coverings being folded into the window openings of the panel members and clamped with the edges of the pane, the top and bottom outer edges of the coverings being engaged in the said channels and their side edges being clamped under the inner panel member.

6. The combination of an outer panel member having a window opening therein, the top and bottom edges of said panel member having inwardly facing channels, a window pane, an inner panel member having a window opening therein arranged with its inner edges overlapping the pane, and coverings for said panel member, the inner edges of the coverings being folded into the window openings of the panel members and clamped with the edges of the pane, the top and bottom outer edges of the coverings being engaged in the said channels and their side edges being clamped under the inner panel member.

7. The combination of an outer panel member having a window opening therein, the top and bottom edges of said panel member having inwardly facing channels, pane supporting members on the inner side of said outer panel member disposed in spaced relation to the edges of the window opening, a window pane arranged with its edges within said members, and an inner panel member having a window opening therein arranged with its inner edges overlapping the pane and its top and bottom edges within said channels.

8. The combination of an outer panel member having a window opening therein and at least one edge of said panel member having an inwardly facing channel, a window pane, an inner panel member secured upon the inner side of said outer panel member to clamp said window pane with an edge lying within said channel, and coverings for said panel member, the inner edges being folded into the window openings and clamped with the window pane, the outer edges adjacent said channel being inserted therein.

9. The combination of an outer panel member having a window opening therein and at least one edge of said panel member having an inwardly facing channel, a window pane, and an inner panel member secured upon the inner side of said outer panel member to clamp said window pane with an edge lying within said channel.

10. The combination of an outer panel member having a window opening therein, at least one edge of said panel member having an inwardly facing channel, a window pane, an inner panel member secured upon the inner side of said outer panel member to clamp said window pane, and coverings for said panel members disposed with their outer edges adjacent said channel and secured therein.

11. The combination of an outer panel member having opposed inwardly facing channels at its outer edges, a rear panel member having its opposed edges engaged in said channel, and coverings for said panel members having their outer edges arranged in and secured in said channels.

12. The combination of an outer panel member having an inwardly facing channel at at least one edge, an inner panel member secured upon the inner side of said outer panel member and with an edge lying within said channel, and coverings for said panel members having outer edges secured within said channel by said inner panel.

13. The combination of an outer panel member having an inwardly facing channel at at least one edge, an inner panel member secured upon the inner side of said outer panel member and with an edge lying within said channel, and a covering for said inner panel member having an outer edge clamped within said channel by said inner panel member.

14. The combination of an outer panel member having an inwardly facing channel at at least one edge, an inner panel member secured upon the inner side of said outer panel member, and a covering for said inner panel member having an outer edge clamped within said channel by said inner panel member.

In witness whereof, I have hereunto set my hand and seal.

JOHN A. FLECKENSTEIN. [L. S.]